(12) United States Patent
Koeger et al.

(10) Patent No.: US 11,808,240 B2
(45) Date of Patent: Nov. 7, 2023

(54) AIR FILTER INCLUDING A SCAVENGING SYSTEM

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

( * ) Notice: Subject to any disclaimer, the term of this patent is extended or adjusted under 35 U.S.C. 154(b) by 573 days.

(21) Appl. No.: 16/959,316

(22) PCT Filed: Jan. 3, 2019

(86) PCT No.: PCT/IL2019/050020
§ 371 (c)(1),
(2) Date: Jun. 30, 2020

(87) PCT Pub. No.: WO2019/150356
PCT Pub. Date: Aug. 8, 2019

(65) Prior Publication Data
US 2020/0368664 A1 Nov. 26, 2020

(30) Foreign Application Priority Data

Feb. 3, 2018 (IL) .......................................... 257321

(51) Int. Cl.
*F02M 35/022* (2006.01)
*F02M 35/024* (2006.01)
(Continued)

(52) U.S. Cl.
CPC ....... *F02M 35/0216* (2013.01); *B01D 46/521* (2013.01); *B01D 50/20* (2022.01);
(Continued)

(58) Field of Classification Search
None
See application file for complete search history.

(56) References Cited

U.S. PATENT DOCUMENTS

| 4,482,366 A | 11/1984 | Camplin et al. |
| 4,537,608 A | 8/1985 | Koslow |

(Continued)

FOREIGN PATENT DOCUMENTS

| DE | 102014014029 A1 * | 8/2015 | ......... B01D 46/0002 |
| GB | 2377190 A * | 1/2003 | .............. F02B 63/02 |

OTHER PUBLICATIONS

Apr. 18, 2019 Search Report issued in International Patent Application No. PCT/IL2019/050020.
Apr. 18, 2019 Written Opinion of the International Searching Authority issued in International Patent Application No. PCT/IL2019/050020.
Aug. 21, 2023 Search Report issued in European Patent Application No. 19747498.4.

*Primary Examiner* — Jennifer A Leung
(74) *Attorney, Agent, or Firm* — Oliff PLC

(57) ABSTRACT

An engine air filter for heavy dust conditions such as used in heavy military and off-road vehicles, including a scavenging system, and a method of operation thereof. The air filter includes: a housing, a precleaner, a permeable filter, and a scavenger system. The scavenger system disposes of particles collected at the precleaner and on the upstream surface of the permeable filter. The scavenger system includes: an air suction source and a three way valve. The three way valve is airflow coupled to the precleaner, to the permeable filter and to the air suction source. The three way valve enables scavenging of the precleaner and the permeable filter alternately. Optionally, the air filter may further includes a pulse jet back-flow flush system.

10 Claims, 5 Drawing Sheets

(51) Int. Cl.
*F02M 35/08* (2006.01)
*B01D 45/16* (2006.01)
*B01D 46/52* (2006.01)
*F02M 35/02* (2006.01)
*B01D 50/20* (2022.01)
*B01D 46/00* (2022.01)
*B01D 46/10* (2006.01)
*B01D 46/71* (2022.01)

(52) U.S. Cl.
CPC ...... *F02M 35/0201* (2013.01); *F02M 35/024* (2013.01); *F02M 35/0223* (2013.01); *F02M 35/08* (2013.01); *F02M 35/086* (2013.01); *B01D 46/0005* (2013.01); *B01D 46/10* (2013.01); *B01D 46/71* (2022.01); *B01D 2279/60* (2013.01)

(56) References Cited

U.S. PATENT DOCUMENTS

| | | | |
|---|---|---|---|
| 5,401,285 | A | 3/1995 | Gillingham et al. |
| 5,616,171 | A * | 4/1997 | Barris ............ F01N 3/22 55/282.3 |
| 6,161,250 | A | 12/2000 | Young et al. |
| 7,682,413 | B2 | 3/2010 | Sheidler |
| 8,074,671 | B2 | 12/2011 | Castronovo et al. |
| 8,951,321 | B2 | 2/2015 | Gillingham et al. |
| 9,273,648 | B2 * | 3/2016 | Link ............ F02M 35/086 |
| 11,333,111 | B2 * | 5/2022 | Koeger ............ F02M 35/084 |
| 2004/0178129 | A1 | 9/2004 | Rizzo |
| 2017/0204816 | A1 | 7/2017 | Meyer et al. |
| 2019/0176075 | A1 * | 6/2019 | Hoff ............ F02M 35/024 |
| 2020/0391150 | A1 * | 12/2020 | Olson ............ B01D 46/71 |

* cited by examiner

AIR FILTER INCLUDING A SCAVENGING SYSTEM

FIELD OF THE INVENTION

The present invention relates to an engine air filter for heavy dust conditions, including a scavenging system, and a method of operation thereof, more particularly to an air filter including a scavenging system for heavy military and off-road vehicles.

BACKGROUND OF THE INVENTION

It is known in the art of air filters for heavy dust conditions, in particular vehicular air filters of military and heavy off-road vehicles, to use a vortex type precleaner in conjunction with a permeable filter. The permeable filter is typically equipped with a pulse jet back-flow flush system. Such filter assemblies are equipped with a scavenger arrangement for disposing of large or heavy particles collected at both the precleaner and the permeable filter.

U.S. Pat. No. 4,482,366 filed on June 1983, discloses the process of removing embedded particulates from the pore surfaces of an engine air cleaner by blowing Pulses (or Jets) of compressed air through the filter media in the reverse flow direction.

U.S. Pat. No. 4,537,608 filed on November 1983, discloses the use of a vortex precleaner and a depth type barrier filter which are disposed in series. A scavenger system, powered by an external source of air flow, simultaneously removes heavy particles trapped at the vortex precleaner and at the depth type barrier filter.

U.S. Pat. No. 5,401,285 filed on September 1993, discloses an air cleaner assembly including a vortex type precleaner, a permeable filter and a scavenger arrangement powered by an external blower. The ambient air directed into the precleaner is subjected to some particulate material removal. The air from the precleaner is then directed into the permeable filter, for further removal of particulate material. The scavenger arrangement is adapted to scavenge separated particulate material from both the precleaner and the permeable filter. An intermittently operated pulse jet back-flow flush system is provided to knock particulate material trapped on the upstream face of the permeable filter. The knocked particulate material is collected and disposed off through the suction side of the scavenger blower.

U.S. Pat. No. 5,401,285 mentioned above, highlights the difficulty of effectively scavenging both the precleaner and the permeable filter without having to increase the size of the scavenging blower. According to the invention, efficient scavenging draw from the bottom of the permeable filter is facilitated by the size, shape and porosity of the scavenging ducts positioned therein. The proposed scavenging ducts are constructed as a conduit extending downwardly into the housing and then across the housing floor. Each scavenge duct includes a plurality of apertures or holes therein. The holes are positioned in the portion of the conduit that extends across the floor. In general, as air is drawn into the holes, particulate material in the housing will also be drawn into the scavenge duct. Thus, through appropriate attachment of a blower to the exit of the conduit, continuous (or at least selected) vacuuming or sweeping of the filter housing is provided, to facilitate extended operation without plugging of the filters. The particular configuration of conduits, and orientation of holes therein, facilitates operation.

U.S. Pat. No. 8,951,321 filed on September 2007, introduces some modifications to the scavenger arrangement of the above mentioned U.S. Pat. No. 5,401,285. The modifications suggests a very specific pattern of openings in the scavenge ducts that performs a better suction of the collected particulate material from the bottom of the permeable filter.

The above prior art indicates the difficulty in obtaining an efficient scavenging process for air filters working in heavy dust conditions, off-road equipment and specifically military vehicles where the physical space is limited. Accordingly there is a need to further optimize or otherwise revise the above prior art systems in order to provide an efficient scavenging system and a sequence of operation thereof.

SUMMARY OF THE INVENTION

Accordingly, it is a principal object of the present invention to overcome the disadvantages and limitations of prior art systems and provide an air filter for heavy dust conditions, with an efficient scavenging system.

According to one aspect of the present invention, the air filter comprises: a housing, a precleaner, a permeable filter, and a scavenger system. The scavenger system disposes of particles collected at the precleaner and on the upstream surface of the permeable filter. The scavenger system comprises: an air suction source and a three way valve. The three way valve is airflow coupled to the precleaner, to the permeable filter and to the air suction source. The three way valve enables scavenging of the precleaner and the permeable filter alternately.

According to another aspect of the present invention, the air filter may further comprise a pulse jet back-flow flush system.

The invention also seeks protection for a method of operation of the above described air filter. Accordingly there is provided a method for a scavenging sequence of an air filter for heavy military and off-road vehicles comprising the steps of:
a) providing an air filter comprising: a housing; a precleaner, a permeable filter; and a scavenger system, the scavenger system further comprising: an air suction source; and a three way valve;
b) optionally providing a pulse jet back-flow flush system;
c) setting the three way valve to scavenge the precleaner;
d) enabling the air suction source to dispose of particles collected by the precleaner;
e) operating the air filter until a determinable amount of particulate material is collected on the upstream surface of the permeable filter;
f) setting the three way valve to scavenge the permeable filter;
g) operating the pulse jet back-flow flush system, if fitted;
h) enabling the air suction source to dispose of particles now located below the permeable filter; and
i) repeating steps c to h as needed.

According to an aspect of the invention, steps b and g depend on the actual implementation of the system and are not mandatory for operation of the basic implementation of the present invention.

BRIEF DESCRIPTION OF THE DRAWINGS

The invention and the way it may be carried out in practice, will be understood with reference to the following illustrative figures, by way of non-limiting example only, in which like reference numerals identify like elements, and in which.

DETAILED DESCRIPTION OF EMBODIMENTS

According to the present invention there is provided an air filter for heavy dust conditions such as military and off-road vehicles operative in harsh environments. The air filter includes a scavenging system, and a sequence of operation thereof is provided.

Figure 1:
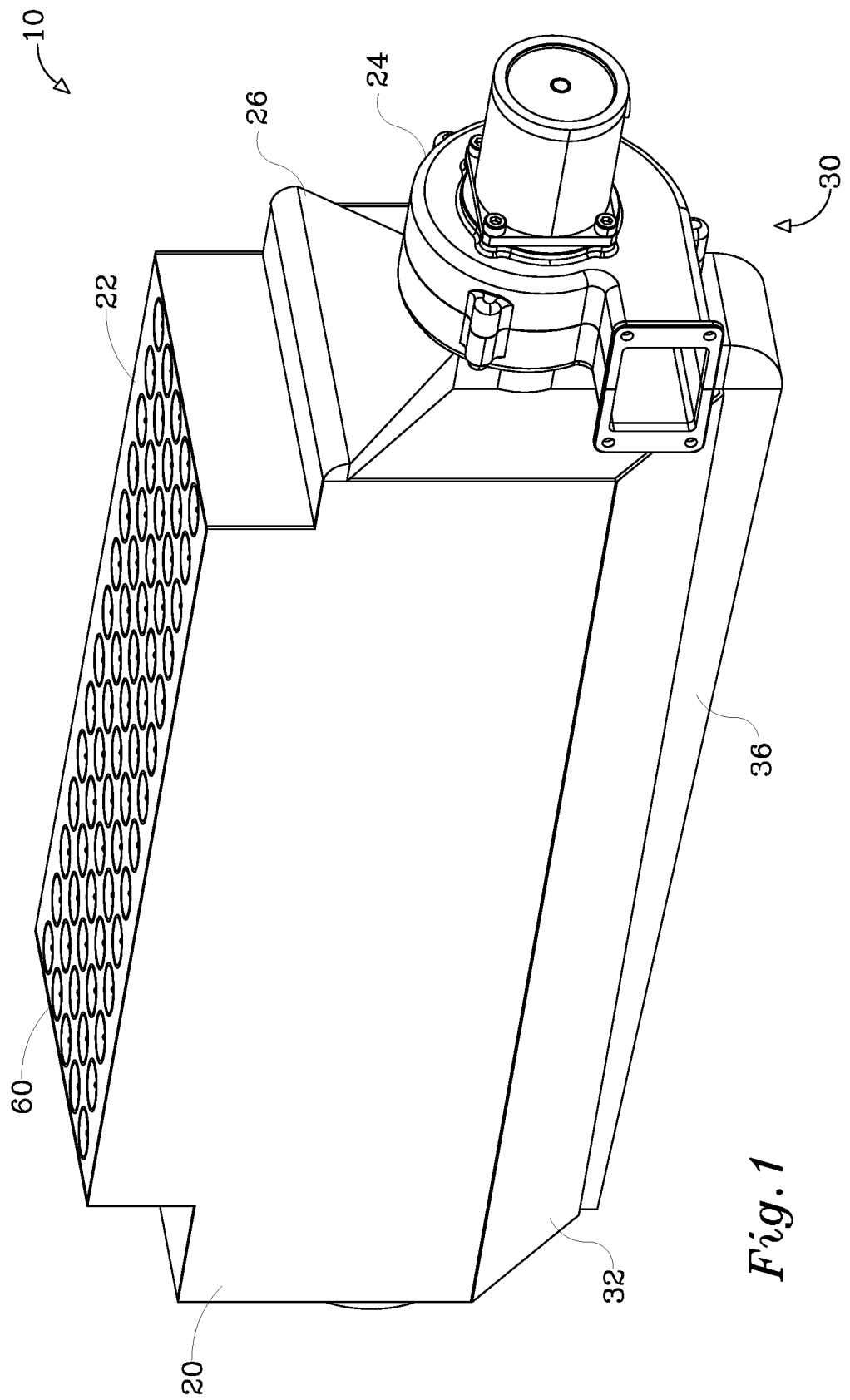
FIG. 1 is a perspective view of an air filter made according to an embodiment of the present invention, shown fully assembled.
Figure 2:
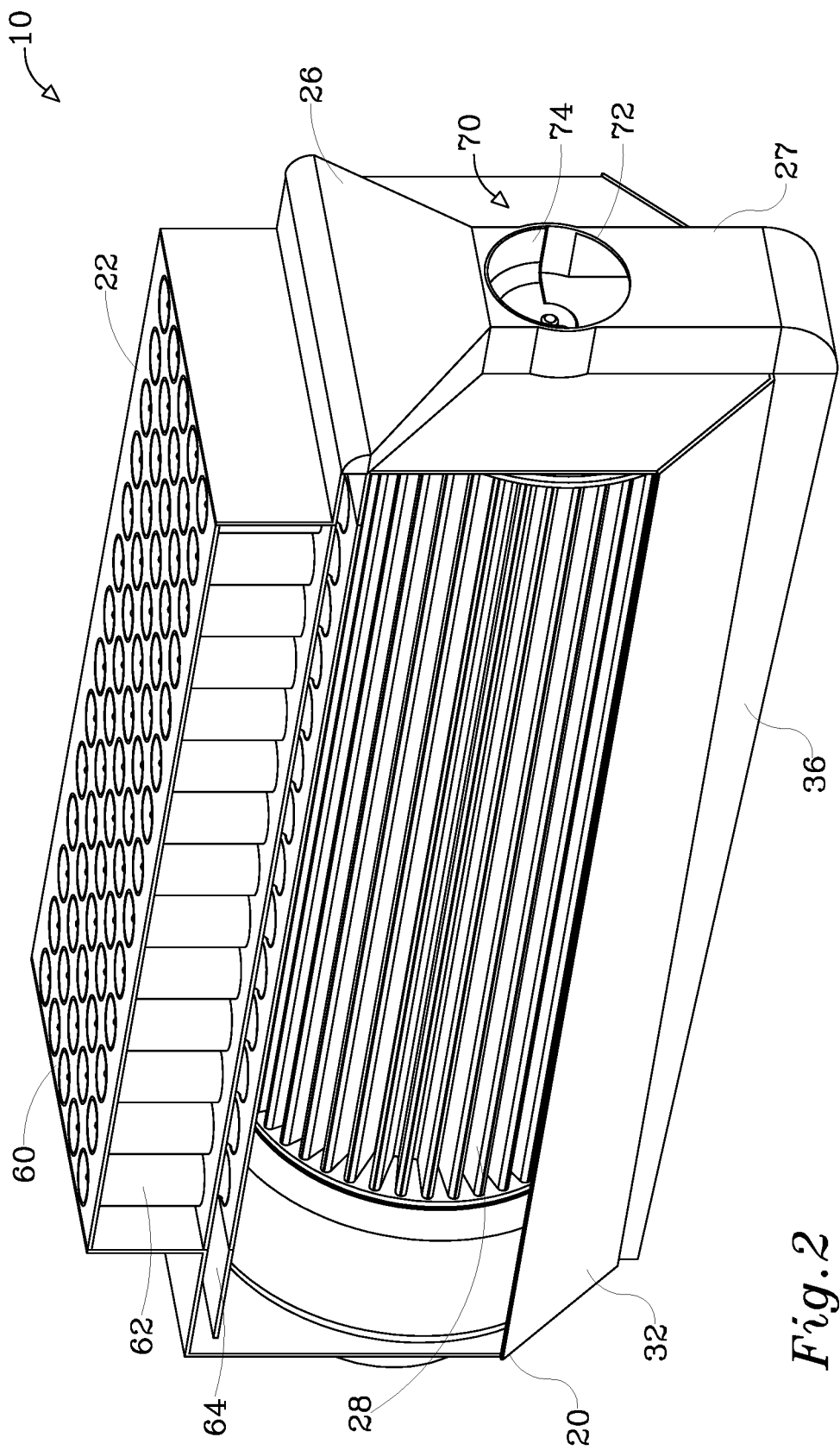
FIG. 2 is a perspective view of the air filter of FIG. 1, shown with one side wall and the scavenger blower removed.

With reference to the figures, according to one embodiment of the present invention, there is shown in FIG. 1, a fully assembled air filter generally referenced 10, and in FIG. 2, the same assembly with some parts removed for clarity. As shown in FIGS. 1 and 2, the air filter comprises: an external housing 20, an inlet grill 22 located on top of a precleaner 60, at least one permeable filter 28, shown cylindrical by way of example only, and a scavenger system generally referenced 30 (FIG. 1). The scavenger system 30 disposes of particles collected at the precleaner 60 collecting gap 64, and on the upstream or outer surface of the permeable filter 28 as will be herein after explained. The scavenger system 30 comprises: an air suction source such as an electric blower 24, located in front of the housing 20, and a three way valve generally referenced 70 (FIG. 2) located between the housing 20 and the blower 24. The three way valve 70 two inlets are airflow coupled by an upper duct 26 to the precleaner 60 collecting gap 64, and by a lower duct 27 to the permeable filter 28 collecting channel 36 running longitudinally under the perforations 46 (FIG. 4) made to the bottom wall 34 of the housing 20. The outlet 72 of the three way valve 70 is airflow coupled to the air suction source such as blower 24 suction port. According to the present invention, the three way valve 70 enables scavenging of the precleaner 60 and the permeable filter 28, alternately thus saving space and energy that would have bean required by a larger blower capable of scavenging both the precleaner 60 and the permeable filter 28 simultaneously.

Figure 3:
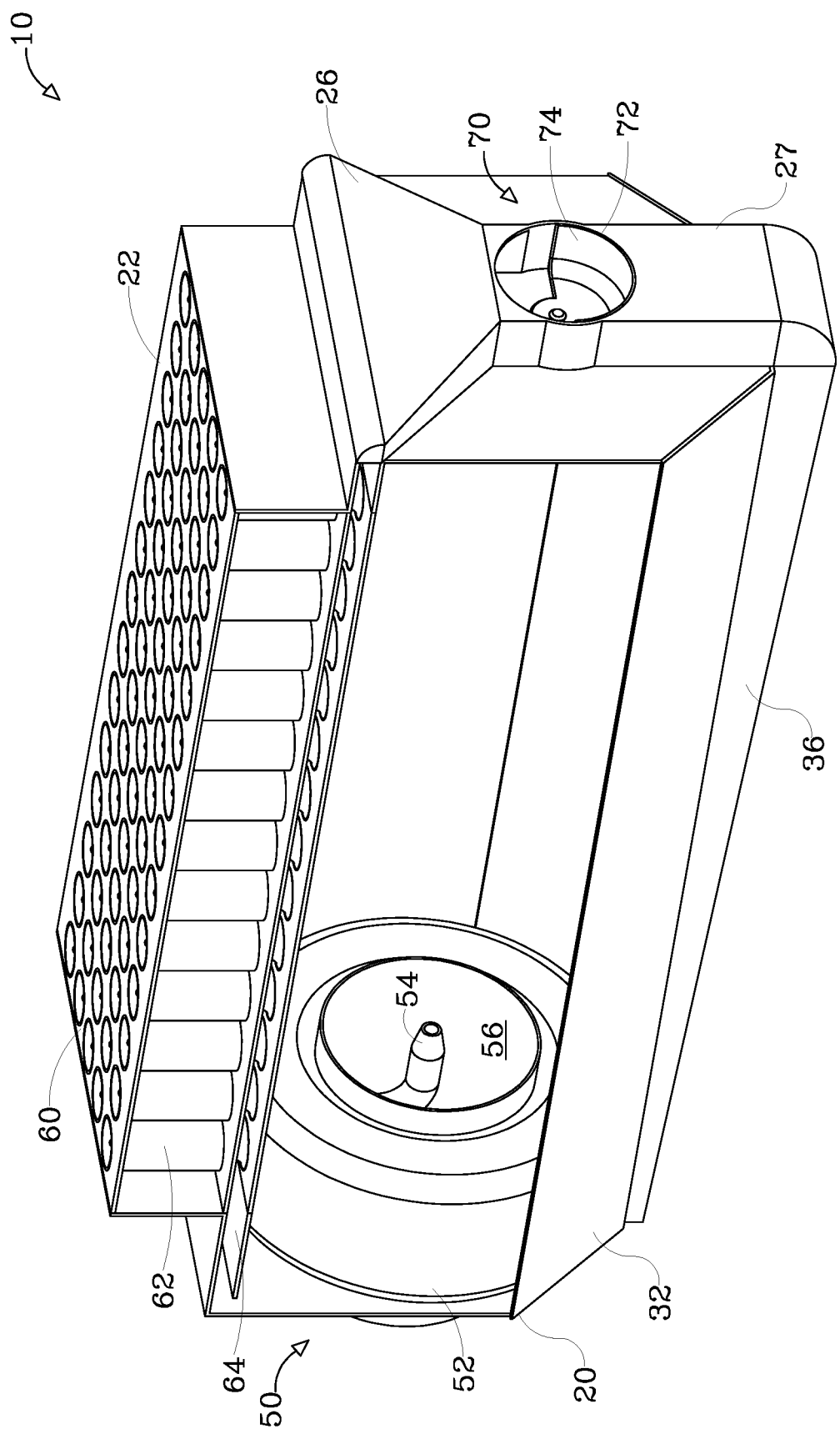
FIG. 3 is a perspective view of the air filter of FIG. 2, shown without the permeable filter and depicting a second position of the three way valve.

With reference to FIG. 3, the air filter 10 is shown with the permeable filter 28 removed to expose an optional pulse jet back-flow flush system generally referenced 50. The pulse jet back-flow flush system comprises an air tank 52 depicted tubular in shape, by way of example only, and a nozzle 54 located substantially at the center of the outlet pipe 56. A fast acting valve (not shown) located in the air tank 52 releases pulses of compressed air through the nozzle 54 to create a back-flow jet of air that releases particles from the upstream surface of the permeable filter 28 as known in the art.

Further shown in FIGS. 2 and 3 is the mentioned above precleaner 60, typically a multi vortex tube type precleaner. Air drawn through each of the vortex tubes 62, circulates about a vertical central axis such that the heavy particles are pushed against the wall of the vortex tube and falls down to the precleaner collecting gap 64. The scavenging blower pulls a stream of air that evacuates the particles from the precleaner collecting gap 64 through the upper duct 26 and back to the atmosphere. The scavenging blower 24 may be operated constantly or intermittently. Optionally a different type of air suction source may be used, such as a venturi pump using the exhaust fumes as the main gas stream of the venturi pump.

Yet with reference to FIGS. 2 and 3, as mentioned above, the three way valve generally referenced 70, enables scavenging of the precleaner 60 and the permeable filter 28 alternately. The three way valve shown in the figures, by a way of example only, is a pneumatically actuated rotational valve. As shown in the figures, the three way valve 70 has a round opening 72 where the scavenging blower 24 (not shown in FIGS. 2 and 3) suction port is connected. The scavenging blower 24 may be constantly or intermittently operated as needed according to the field dust load conditions. Inside the three way valve 70 there is a rotatable hemicylindrical vane 74, shown at the upper position in FIG. 2, and at the lower position in FIG. 3. Accordingly, when the hemicylindrical vane 74 is rotated to the upper position (FIG. 2) there is an open airflow path from the permeable filter collecting channel 36 through the lower duct 27 and opening 72 to the scavenging blower 24. In contrast, when the hemicylindrical vane 74 is rotated to the lower position (FIG. 3) there is an open airflow path from the precleaner collecting gap 64 through the upper duct 26 and opening 72 to the scavenging blower 24.

Figure 4:
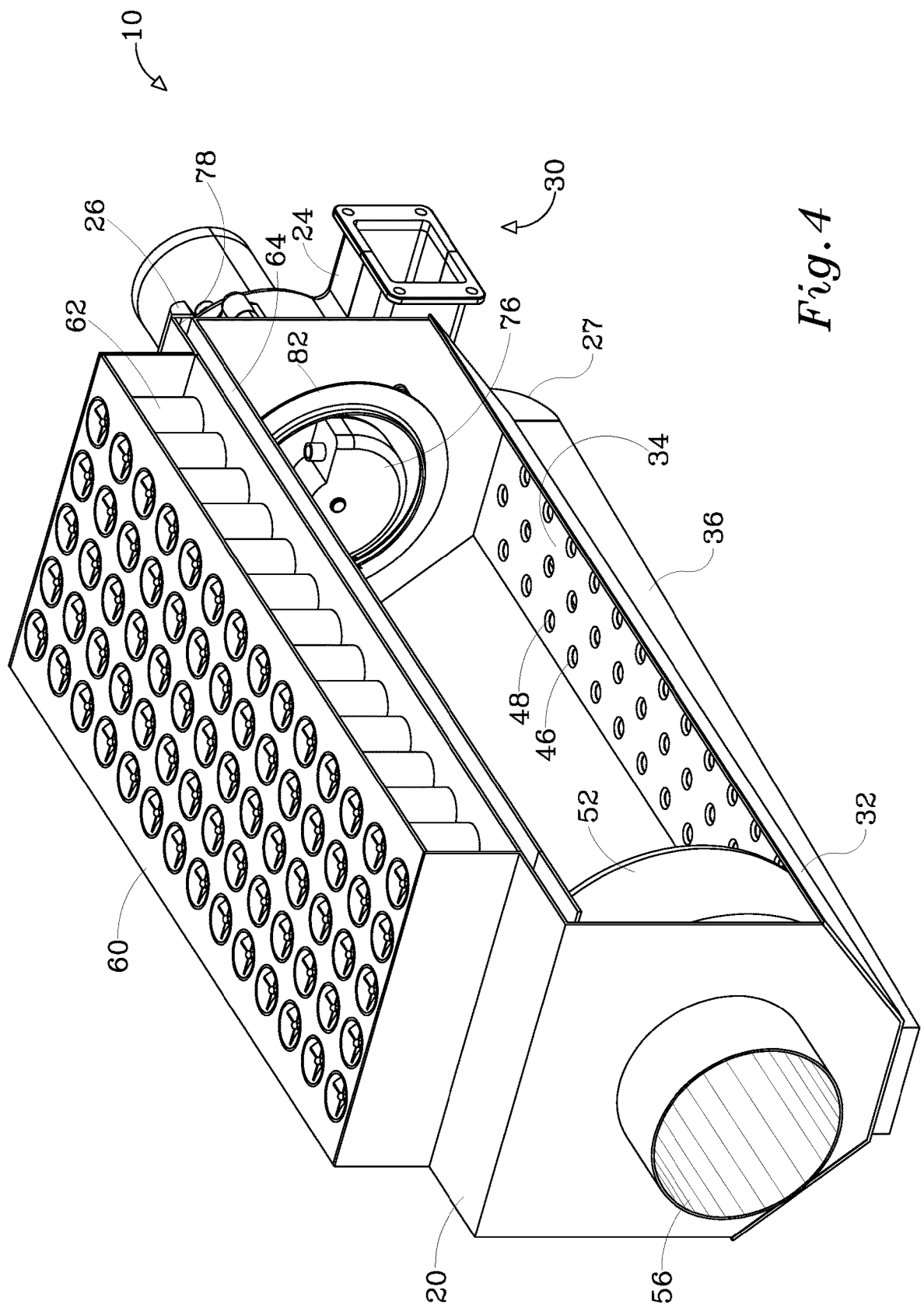
FIG. 4 is a different perspective view of the air filter shown with one side wall and the permeable filter removed.
Figure 5:
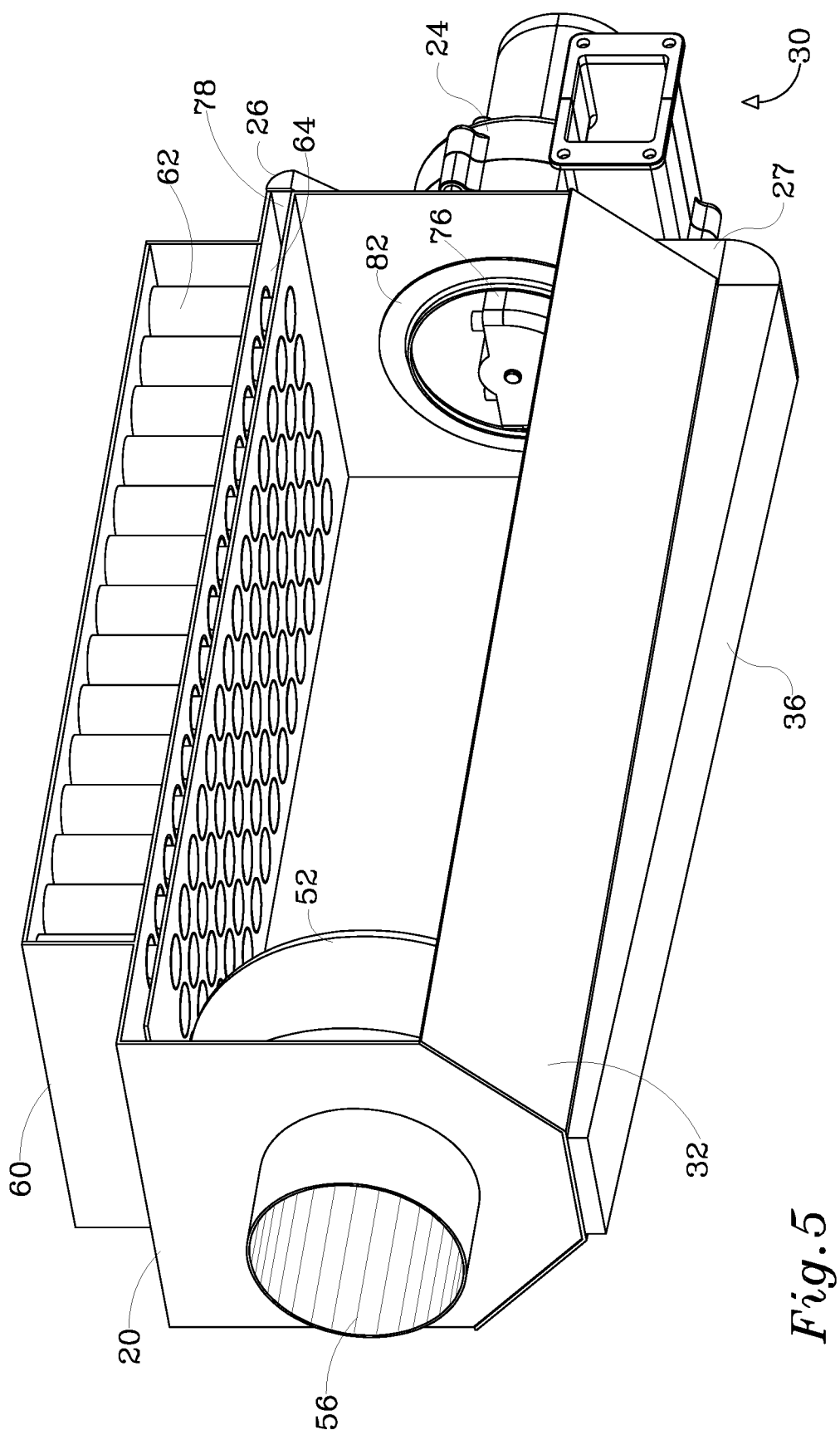
FIG. 5 is yet a different perspective view of the air filter as shown in FIG. 4.

With reference now to FIG. 4, the hemicylindrical vane 74 is rotated by an actuator 76 located in the housing 20. The actuator 76 shaft is extending into the three way valve 70 central space through an opening in the housing 20 front wall. When the actuator 76 is seated in position, the hemicylindrical vane 74 is fitted to the shaft of the actuator 76. The actuator 76 may be a pneumatic actuator, however electric motorized actuator or mechanical actuator are also possible. It will be understood that the three way valve 70 may be implemented in many different ways for example using two phase shifted swivel louver blades, one located at the upper duct 26 and the other at the lower duct 27, thus one is blocking the flow path while the other permits flow. The use of two independent valves associated by a system control is also possible.

Yet with reference to FIG. 4, there is shown a corner of the the upper duct 26 depicting also an inlet 78 of the upper duct 26, scavenging the precleaner collecting gap 64. Also shown a portion of the lower duct 27 scavenging the permeable filter 28 through perforations 46 made at the bottom wall of the housing 20 and collecting channel 36. The perforations 46 may be chamfered 48 upwardly to improve the dust collection capability by natural gravity. The lower wall portions 32 of the housing 20 are arranged as a funnel to direct the particulate material falling by gravity to the narrow perforated portion of the housing 20 bottom wall 34. A spring loaded ring 82 affixes the permeable filter 28 in position and presses the other end of the permeable filter 28 against the air tank 52. It will be understood however that other means for affixing the permeable filter 28 in position may be used such as screws, eccentric lock, latch, wedge or a collapsible clamping ring.

As indicated in the background, the air filter 10 is intended for use in military and heavy off-road vehicles where large mass of particulate material should be removed from the ambient air before it is permitted into the inlet manifold of the main engine. It is known in the art of such filters that the vortex type precleaner may remove up to 99% of the contaminants from the air stream, accordingly it is desired that the three way valve 70 is set to scavenge the precleaner 60 most of the time. However, during operation the permeable filter 28 gradually collects particulate material on the upstream surface to a point where there is a significant air flow restriction and pressure drop over the permeable filter 28. At this point a control system of the air filter activates the pulse jet system to produce a series of backflow jet pulses. The particulate material knocked off the permeable filter 28 falls down by gravity through perforations 46 made in the bottom wall 34 of housing 20, into the permeable filter collecting channel 36. The precleaner 60 is shown in the figures positioned on top the housing 20, however side position is also possible as known in the art. In case that the precleaner is vertically positioned at one or both sides of the housing 20, the dust is collected at the bottom portion of the precleaner and the scavenger duct or ducts will be positioned accordingly.

According to the present invention, substantially at the same time that the pulse jet system is operative, the three way valve 70 is rotated to enable a short period of scavenging of the permeable filter 28 through collecting channel 36. Accordingly, during that period of time, the entire suction power of the scavenging blower 24 is directed to evacuate the relatively small volume of the permeable filter collecting channel 36 thus enabling an efficient scavenging in a relatively short time. When scavenging of the permeable filter collecting channel 36 is completed, the three way valve 70 is rotated back to normal continuous scavenging of the precleaner 60 through collecting gap 64. It will be understood that the sequence of operation may accept variations and the exact periods of time dedicated to each of the process steps may be varied according to environmental conditions and the accumulated operation time of the permeable filter 28.

The present invention seeks protection regarding the air filter as described above, as well as the method steps taken to accomplish the desired result of alternately scavenging both the permeable filter 28 and the precleaner 60 using a space and energy saving scavenger blower 24.

Accordingly a method is provided comprising one or more of the steps below:
a) providing an air filter comprising: a housing; a precleaner, a permeable filter; and a scavenger system, the scavenger system further comprising: an air suction source; and a three way valve;
b) optionally, providing a pulse jet back-flow flush system;
c) setting said three way valve to scavenge said precleaner;
d) operating said air suction source to dispose of particles collected by said precleaner;
e) driving said vehicle until a determinable amount of particulate material is collected on the upstream surface of said permeable filter;
f) setting said three way valve to scavenge said permeable filter;
g) operating said pulse jet back-flow flush system, if fitted;
h) operating said air suction source to dispose of said particles now located below said permeable filter; and
i) repeating steps c to h as needed.

It will be understood that steps b and g depend on the actual implementation of the system and are not mandatory for operation of the basic implementation of the present invention.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. An air filter for heavy dust conditions comprising:
a housing;
a precleaner;
a permeable filter;
a pulse jet back-flow flush system operative on said permeable filter; and
a scavenger system, said scavenger system disposes of particles collected at said precleaner through a collecting gap of said precleaner and an upper duct, and disposes of particles collected on the upstream surface of said permeable filter through perforations made to a bottom wall of said housing, a collecting channel running longitudinally under said perforations and a lower duct, wherein:
said scavenger system comprising an air suction source and a three way valve, and
said three way valve is airflow coupled to said upper duct, said lower duct and said air suction source, said three way valve enables scavenging of said precleaner and said permeable filter alternately.

2. The air filter as claimed in claim 1, wherein said air suction source is an electric blower.

3. The air filter as claimed in claim 2, wherein said blower is constantly operated.

4. The air filter as claimed in claim 2, wherein said blower is intermittently operated.

5. The air filter as claimed in claim 1, wherein said precleaner is a multi vortex tube precleaner.

6. The air filter as claimed in claim 1, wherein said three way valve is pneumatically actuated.

7. The air filter as claimed in claim 1, wherein said three way valve is electrically actuated.

8. The air filter as claimed in claim 1, wherein said three way valve is a rotational valve.

9. The air filter as claimed in claim 1, wherein said three way valve comprises two phase shifted swivel louver blades.

10. A method for a scavenging sequence of an air filter for heavy dust conditions comprising the steps of:
a) providing an air filter comprising: a housing; a precleaner, a permeable filter; and a scavenger system, said scavenger system further comprising: an air suction source; a three way valve; and a pulse jet back-flow flush system; said scavenger system is configured to dispose of particles collected at said precleaner through a collecting gap and an upper duct, and dispose of particles collected on the upstream surface of said permeable filter through perforations made to the bottom wall of said housing, a collecting channel running longitudinally under the perforations and a lower duct;
b) setting said three way valve to scavenge said precleaner;
c) enabling said air suction source to dispose of particles collected by said precleaner;
d) operating said air filter until a determinable amount of particulate material is collected on the upstream surface of said permeable filter;
e) setting said three way valve to scavenge said permeable filter;
f) operating said pulse jet back-flow flush system;

g) enabling said air suction source to dispose of said particles now located below said permeable filter; and h) repeating steps b to g as needed.

\* \* \* \* \*